United States Patent [19]
Sawada et al.

[11] 3,817,406
[45] June 18, 1974

[54] AUTOMATIC STORAGE SYSTEM WITH STACKER CRANES AND LOAD HANDLING DOLLIES

[75] Inventors: Yuji Sawada; Katsumi Takemoto; Yasuro Maruoka; Masayuki Kuroiwa, all of Tokyo, Japan

[73] Assignee: Mitsubishi Jukogyo Kabushiki Kaisha, Tokyo, Japan

[22] Filed: Mar. 16, 1973

[21] Appl. No.: 342,215

[30] Foreign Application Priority Data
Jan. 19, 1973 Japan................................ 48-7875

[52] U.S. Cl. ..................... 214/16.4 C, 214/16.4 A
[51] Int. Cl................................................ B65g 1/06
[58] Field of Search ........ 214/16 B, 16.4 A, 16.4 B, 214/16.4 C

[56] References Cited
UNITED STATES PATENTS

| | | | |
|---|---|---|---|
| 3,417,879 | 12/1968 | Gough................................ | 214/16 B |
| 3,557,973 | 1/1971 | Louviers............................. | 214/16 B |
| 3,610,445 | 10/1971 | Kitchen.............................. | 214/16.4 C |
| 3,709,383 | 1/1973 | Jennings............................. | 214/16 B |

FOREIGN PATENTS OR APPLICATIONS

| | | | |
|---|---|---|---|
| 262,893 | 6/1968 | Austria.............................. | 214/16.4 B |
| 1,202,385 | 8/1970 | Great Britain .................... | 214/16 B |

*Primary Examiner*—Robert G. Sheridan
*Assistant Examiner*—R. B. Johnson
*Attorney, Agent, or Firm*—Cushman, Darby & Cushman

[57] ABSTRACT

In an automatic storage system of the type comprising article receiving dollies and article delivery dollies, a number of racks arranged horizontally in a plurality of rows and vertically in a plurality of stages and each serving simultaneously as dolly running rails, article loading stacker cranes and article unloading stacker cranes respectively movable along the article receiving and delivery ends of said racks and each being provided therein with a vertically movable carriage, article receiving home positions and article delivery home positions respectively provided on the article receiving and delivery sides of the racks, control means provided on the article receiving side of the racks for controlling the article storing operation such that the transfer of an article from each article receiving home position to the article receiving end of a selected rack is effected by one of said article loading stacker cranes and the transportation of the article from said receiving end to an inner position of the rack is effected by one of said article receiving dollies, and control means provided on the article delivery side of the racks for controlling the article delivery operation such that the transportation of an article from the stored position to the article delivery end of the associated rack is effected by one of said article delivery dollies and the transfer of the article from said delivery end to one of the article delivery home positions is effected by one of said article unloading stacker cranes; each of said carriages is provided with a pair of dolly running rails which, when the associated stacker crane is positioned in front of a selected rack, will be aligned with the opposite end of said rack in contact therewith to provide for movement of the dolly from the rack onto the carriage or vice versa and each of said control means is so operative that the dolly transferred onto the stacker crane upon unloading the article therefrom is returned to the rack to or from which the article has been carried in or carried out when the other dolly is available at the rack where the next article storing or delivery operation will take place, or is retained in the stacker crane to be carried to one of the article receiving or delivery home positions when the other dolly is not available at the rack where the next article storing or delivery operation will take place.

5 Claims, 24 Drawing Figures

3,817,406

AUTOMATIC STORAGE SYSTEM WITH STACKER CRANES AND LOAD HANDLING DOLLIES

BACKGROUND OF THE INVENTION

1. Field of the Invention:

This invention relates to improvements in an automatic storage system for such articles as pallets, containers, air cargoes and automobiles.

2. Description of the Prior Art:

An automatic storage system has been known which comprises a large number of racks arranged horizontally in a plurality of rows and vertically in a plurality of stages, article receiving dollies and delivery dollies adapted to travel along said racks, an article receiving home position provided on the article receiving side of said racks, an article delivery home position provided on the article delivery side of said racks, article loading stacker cranes movable along the article receiving ends of said racks and article unloading stacker cranes movable along the article delivery ends of said racks, whereby when an article is to be stored in the system, it is placed in the article receiving home position, transferred to the article receiving end of a selected one of said racks by the article receiving stacker crane, loaded on the article receiving dolly by said receiving stacker crane and carried on said receiving dolly to the position in said selected rack where said article is to be stored, whereas when the article is to be delivered from the system, it is carried on the delivery dolly from the storage position to the article delivery end of said rack, transferred to the article delivery home position along with the article delivery stacker crane and unloaded from said delivery dolly by said delivery stacker crane at said delivery home position. This prior art automatic storage system will be described more practically with reference to FIG. 1 of the drawings. In FIG. 1, reference symbol $a$ designates a large number of racks arranged horizontally in a plurality of rows and vertically in a plurality of stages, said racks serving simultaneously as guide rails for dollys, $b$ an article receiving conveyor line, $c$ article transfer means, $d$ article receiving home positions, $e$ article loading stacker cranes, $f$ an article receiving dolly, $g$ an article delivery dolly, $h$ article unloading stacker cranes, $i$ article delivery home positions, $j$ article transfer means and $k$ an article delivery conveyor line. The article loading stacker crane $e$ carries an article $l$ from the article receiving home position $d$ to the article receiving end of a selected rack $a$, which article $l$ has previously been brought to said article receiving home position $d$ via the article receiving conveyor $b$ and transfer means $c$. At the receiving end of the rack $a$, the article $l$ is transferred onto the article receiving dolly $f$ by a slide fork provided on the loading stacker crane $e$ and carried thereon inwardly of the rack $a$. The receiving dolly $f$ stops when it senses the preceding article already stored on the rack and, after resting the article $l$ on the rack, returns to the receiving end of said rack. The loading stacker crane $e$, after loading the article $l$ on the receiving dolly $f$, also returns to the receiving home position $d$ for receiving the next article. Thus, one cycle of the article storage operation is completed. When the article $l$ thus stored is to be delivered, this can be achieved by operating the above-described procedures in the same manner but in the reverse order. Namely, the article $l$ stored on the rack is delivered to the article delivery home position $i$ by the delivery dolly $g$ and unloading stacker crane $h$ and thence to a prescribed place by the transfer means $j$ and delivery conveyor $k$. In FIG. 2, reference symbols m designates trolly wires for supplying driving power and transmitting control signals to the receiving and delivery dollies $f$, $g$ and $n$ designates a shoe connected to each dolly. The operation of each dolly is controlled through the trolly wires $m$ and shoe $n$. In FIG. 3, reference symbols $f_1$, $g_1$ designate wheels of the dollies $f$, $g$ respectively, and $o$ designates the slide fork provided in each of the loading and unloading stacker cranes $e$, $h$. As shown in FIG. 3, the slide fork $o$ is maintained at a level A when it is moved into the rack $a$, and lowered to a level B at the end of its forward stroke to place the article $l$ on the rack $a$. After placing the article $l$ on the rack $a$, the slide fork $o$ is retracted into the stacker crane $e$, and thereafter, the article $l$ is carried inwardly of the rack $a$. It will be understood that, by operating the above procedures in the reverse way, the article $l$ can be transferred to the stacker crane $h$. Referring to FIG. 4 there is illustrated a manner in which the dolly $f$ or $g$ is transferred from one rack to another by the slide fork $o$. Namely, the slide fork $o$ carrying the dolly $f$ or $g$ thereon is moved into the rack $a$ while being maintained at a level C, lowered to a level D in the rack and then retracted into the stacker crane $e$ or $h$, whereby the dolly $f$ or $g$ is set in the rack $a$. The dolly $f$ or $g$ can be received in the stacker crane $e$ or $h$ by operating the above procedures in the reverse way.

In the prior art automatic storage system described above, use is made of the slide fork $o$ for transferring an article from the stacker crane to the rack or vice versa and for transferring the dolly from one rack to another. Therefore, the system has the disadvantage that there is the necessity for controlling the slide fork in four stages from the level A to D as stated above, rendering stacker crane or slide fork controlling means complicated and costly and rendering the operation thereof also complicated.

Further, in this type of automatic storage system, when it is desired to deliver a number of different types of articles one after another from the system, the unloading stacker crane $h$ is necessarily shifted from the delivery end of one rack to the delivery end of another rack from time to time, and it is essential that the delivery dolly $g$ be available at the rack where the stacker crane $h$ is positioned, because otherwise the article desired to be delivered cannot be brought to the delivery end of said rack to be picked up by the stacker crane $h$. Such difficulty would be avoided by using the receiving dolly $f$ also for carrying the article to the delivery end of the rack or otherwise by bringing the delivery dolly from other rack and placing it on the particular rack in the manner shown in FIG. 4 by the stacker crane $h$ before said stacker crane is set in the position to pick up the article, under the control of control means provided on the delivery side of the system. However, the use of the receiving dolly $f$ for the delivery operation necessitates carrying out the receiving and delivery operations by a single dolly, and thus will bring about the disadvantages that the construction of and control means for the dolly become complicated and that the loading and unloading efficiency of the system is impaired. In addition, in the prior art automatic storage system the transfer of dolly from one rack to another, involving the operations of changing the level of the slide fork $o$ from C to D and vice versa and of moving the same into and out of the stacker crane, is time-consuming. This is because the unloading stacker crane is used for services other than primarily intended to be achieved by said stacker crane. On the other hand, if it is desired to maintain the delivery capacity of the system as a whole at a certain level, use of a number of stacker cranes would be inevitable which are expensive, and the facility cost of the system would rise. The time-consuming problem would otherwise be eliminated by providing the delivery dollies each for each rack, but this would necessitate the provision of a large number of delivery dollies and again result in an increasing facility cost.

SUMMARY OF THE INVENTION

The present invention contemplates the elimination of such disadvantages of the prior art automatic storage system. Namely, the invention is concerned with an automatic storage system of the type comprising article receiving dollies and article delivery dollies, a number of racks arranged horizontally in a plurality of rows and vertically in a plurality of stages and each serving simultaneously as guide rail for said dollies, article loading stacker cranes and article unloading stacker cranes respectively movable along the article receiving ends and article delivery ends of said racks and each provided with a vertically movable carriage, article receiving home positions and article delivery home positions respectively provided on the article receiving and delivery sides of said racks, control means provided on the article receiving side of the system for controlling the operations of said respective elements on the article receiving side of the racks such that the transportation of an article to be stored from said article receiving home position to the article receiving end of a selected rack is achieved by said article loading stacker crane and said carriage, while the transportation of the article from the receiving end of said rack to the position of the rack where said article is to be stored is achieved by said article receiving dolly, and control means provided on the article delivery side of the system for controlling said respective elements on the article delivery side of said racks such that the transportation of an article from the position of the associated rack where said article is stored to the article delivery end of said rack is achieved by said article delivery dolly, while the transportation of the article from said delivery end of the rack to said article delivery home position is achieved by said article unloading stacker crane; said system being characterized in that each of said carriages is provided with rails which will be held in contact with the adjacent end of each rack in alignment therewith when the associated stacker crane is positioned stationarily opposite to said end of the rack, providing for the transfer of the dolly from said rack onto said carriage or vice versa, and each of said control means is designed to control the operation of the associated article loading or unloading stacker crane such that said stacker crane returns to the article receiving or delivery home position, after returning the dolly to the rack to or from which the article has been supplied or taken out in the event when a dolly is existing at the rack to which said stacker crane will be shifted next, or with the dolley carried thereon in the event when a dolly is not existing at the rack to which said stacker crane will be shifted next. It is the object of the present invention to provide an improved automatic storage system of the type described, in which the stacker cranes are simplified in construction and reduced in cost, and the number of said stacker cranes is reduced to minimum by curtailing the time required for carrying articles into and from the racks and the time required for transferring the dolly, and further the number of the dollies is reduced to minimum by effecting the transfer of the dolly by each stacker crane in the event when the rack where the article loading or unloading operation will take place next is not provided with a dolly, so as to reduce the facility cost of the system.

In the automatic storage system of the invention having the construction described above, when articles are to be carried successively onto the same rack, the articles are transported to the article receiving home position via the article receiving conveyor and transfer means, and the loading stacker crane positioned opposite to said receiving home position picks up the articles one at a time. The stacker crane travels to a selected rack, carrying the article, and stops opposite to the article receiving end of said rack. In this case, the dolly running rails provided on the stacker crane are aligned with the rack which serves simultaneously as dolly running rails, and the receiving dolly is transferred onto the stacker crane from the rack to receive the article thereon. The receiving dolly, with the article thereon, again transfers onto the rack and travels along the rack inwardly and stops upon sensing the preceding article already stored on the rack. After loading the article on the rack, the dolly returns to the receiving end of the rack. On the other hand, the loading stacker crane returns to the receiving home position to pick up the next article. The above-described operations are repeated until all of the articles are carried onto the same rack. Now, when articles are to be carried onto different racks, the procedures are the same as described above up to the point when the receiving dolly returns to the receiving end of the rack after loading the first one of the articles on the rack. However, the receiving dolly returning to the receiving end of the rack rides on the dolly running rails provided in the stacker crane and being in alignment with said rack. The stacker crane returns to the receiving home position with said receiving dolly therein, and loads the next article on said receiving dolly. Then, the stacker crane travels to the other selected rack on which the article is to be stored and stops thereat. In the stopped position of the stacker crane, the dolly running rails provided in said stacker crane are also aligned with the rack, so that the receiving dolly transfers onto the rack with the article carried thereon and travels along the rack to the position where the article is to be stored. In the manner described, the articles at the receiving home position are carried onto different racks one after another. On the other hand, when the articles are to be delivered successively from the same rack, the unloading stacker crane and the delivery dolly are operated in the same manner as in the case of carrying articles successively onto the same rack described above but in the reverse way. Further, when the articles are to be delivered from different racks, the unloading stacker crane returns to the delivery home position, with or without the delivery dolly therein depending upon whether a receiving dolly is available or not at the rack where the delivery operation will take place next. Namely, when the delivery dolly is available at the rack where the delivery operation will take place next, the unloading stacker crane allows the used dolly to transfer onto the rack therefrom, but when the delivery dolly is not available at the rack where the delivery operation will take place next, the stacker crane returns to the delivery home position with the used dolly therein and, in this case, the article carried on said dolly only is unloaded. After unloading, the stacker crane is shifted to the other rack where the receiving dolly is not available, and the dolly carried by said stacker crane is transferred onto the rack to bring the next article to the delivery end of said rack and again rides on the stacker crane with the article thereon. Thereafter, the above-described operations are repeated. Thus, the articles are delivered successively from different racks. All of the above-described operations take place under control of the control means respectively provided on the article receiving and delivery sides of the system.

It should be noted here that, with the dolly running rails provided in each stacker crane, the transfer of articles from the loading stacker crane onto the receiving end of the rack and from the delivery end of the rack onto the unloading stacker crane is effected simply by the movement of the dolly. This means that the dolly running rails of simple construction substitute for the slide fork of complicated construction which has been provided in stacker crane of the prior art system as article transfer means, and is advantageous in simplifying the construction of the stacker crane and reducing the cost of the same.

According to the present invention, as described above, it is possible to eliminate the slide fork which has been used in the prior art system and required to be controlled in four stages. The elimination of the slide fork is advantageous in curtailing substantially the times required for the transfer of articles to and from the racks. Consequently, the time for which the stacker cranes are used for other than the service primarily intended by said stacker cranes can be shortened and, therefore, the number of the stacker cranes in the entire system can be reduced. Further, in the present invention each of the stacker cranes upon completion of the loading or unloading operation returns to the associated home position, with or without the used dolly depending upon whether a dolly is available or not at the rack where the stacker crane will be engaged in the article loading or unloading operation next, under the control of the control means, so that it is unnecessary to provide dollies each for each rack and hence the number of the dollies in the entire system can be reduced.

According to one aspect of the invention there is provided an automatic storage system of the type described, in which the stacker cranes can be simplified in construction and reduced in cost which are primarily expensive, and the numbers of the stacker cranes and dollies can be decreased, and which, therefore, is highly advantageous in respect of facility cost.

According to another aspect of the invention there is provided an automatic storage system of the type described, in which the carriage vertically movable provided in each stacker crane is provided with a pair of rails to provide for transfer of the dolly between the rack and carriage, and also with a chain conveyor on the outer side of said rails to provide for transfer of an article between the carriage and article receiving or delivery home position thereon, the level of the upper run of said conveyor being made higher than the level of the upper surfaces of said rails.

Such arrangement of the invention is advantageous in that, when the stacker crane is positioned opposite to an end of the rack, the associated dolly can be transferred smoothly from the carriage onto the rack or vice versa, and further, when the stacker crane is positioned opposite to the article receiving or delivery home position, the article carried by said stacker crane can be transferred from the carriage (stacker crane) to the home position, only by means of the chain conveyor with the dolly being held stationary, since the upper run of said chain conveyor is at a level higher than the upper level of the rails, so that the transfer of article can be achieved quickly smoothly and the article can be handled efficiently.

According to still another aspect of the invention there is provided an automatic storage system of the type described, in which a horizontal bar is provided on each side of each stage of racks extending along the receiving or delivery ends of the racks of said stage at a position outwardly downwardly of said rack ends and stopper members are provided on said horizontal bar each opposite to each rack, while a retractable engaging member is provided on the underside of each dolly, which is normally projected from said dolly for engagement with said stopper member when the stacker crane is not in front of the receiving or delivery end of the rack, whereby said dolly is prevented from moving off the rack.

Such arrangement is advantageous in preventing the dropping of dolly from each rack and thereby ensuring the safety operation of the system and precluding damages to the constituent elements of the system and the articles being handled.

According to still another aspect of the invention there is provided an automatic storage system of the type described, in which the receiving and delivery ends of a pair of parallel bars constituting each rack and serving simultaneously as dolly running rails are expanded outwardly relative to each other, and the ends on the rack side of the rails provided on the carriage are also expanded outwardly relative to each other, and further outwardly projectable guide rolls are provided on each side of the dolly.

Such arrangement is advantageous in achieving the transfer of dolly from the rack to carriage or vice versa very smoothly.

According to a further aspect of the invention there is provided an automatic storage system of the type described, in which each dolly is provided therein as driving means with a battery, a forward driving relay and a backward driving relay respectively for driving the dolly forwardly and backwardly in response to command signals, and a high speed driving relay for driving the dolly at a high speed in the event when no article is mounted on the dolly.

Such arrangement is advantageous in that, since the dolly is self-powered by the battery disposed therein for running in one or the other direction or at an increased speed when it is not carrying an article thereon, it is unnecessary to provide trolley wires in each rack as has been necessary in the conventional systems and to diminish the wear problem of trolley and shoe as has been encountered heretofore, with the result that not only is the installation of the system facilitated but also the maintenance and inspection of the system can be much simplified.

Figure 1:
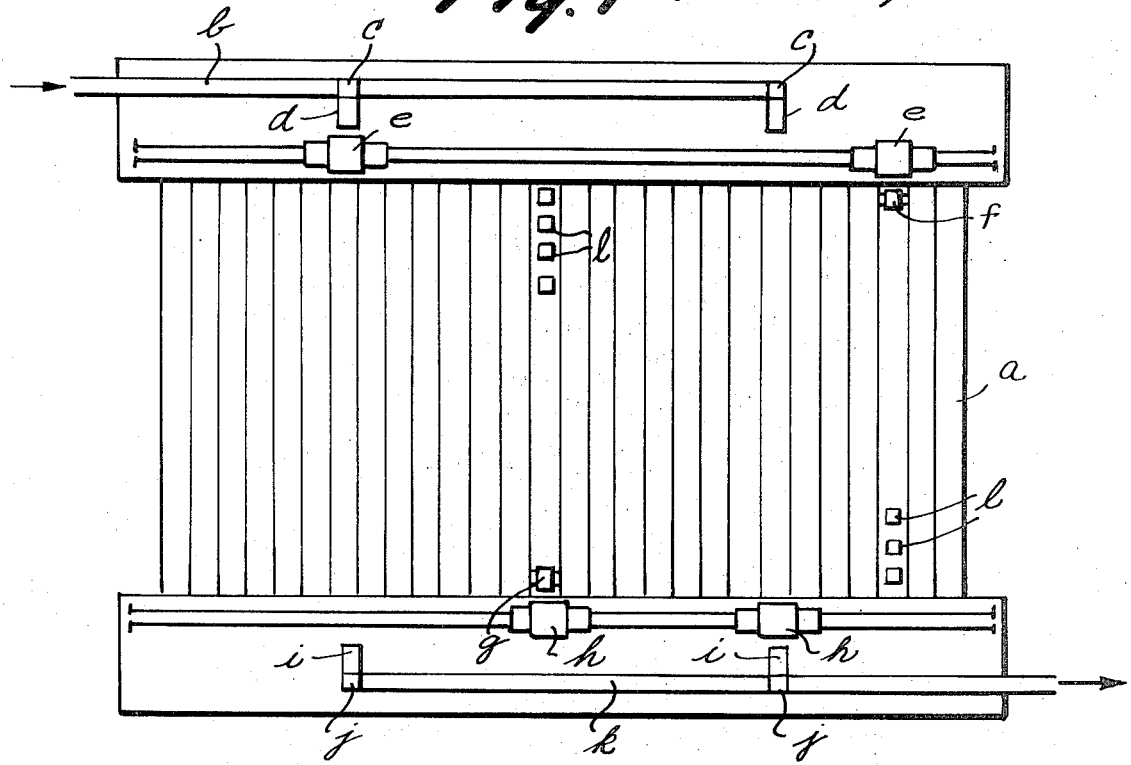
FIG. 1 is a plan view of a conventional automatic storage system of the type with which the present invention is concerned.
Figure 2:
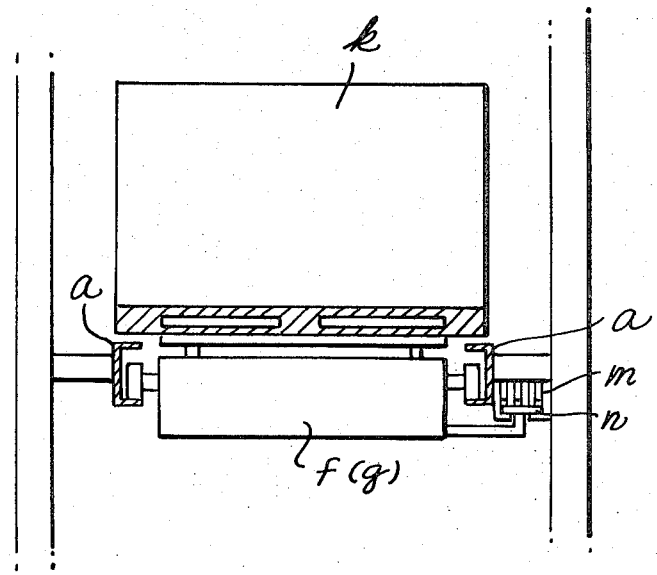
FIG. 2 is a fragmentary vertical sectional front view of the rack of the system.
Figure 3:
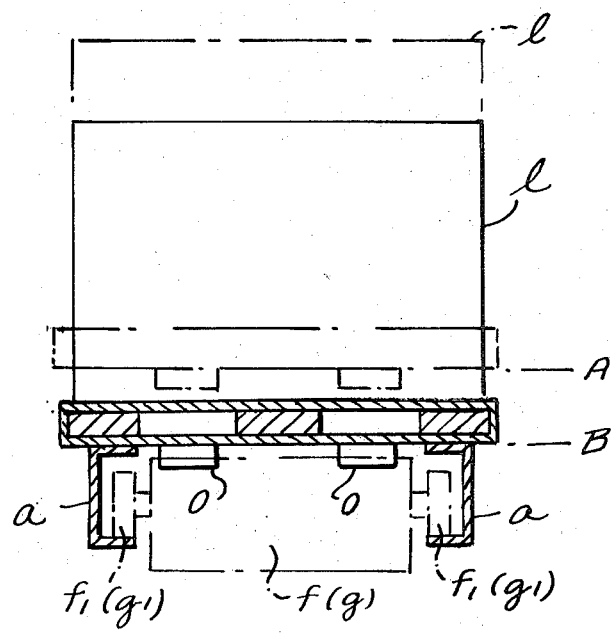
FIGS. 3 and 4 are views illustrating the manner in which a fork of a stacker crane operates.
Figure 4:
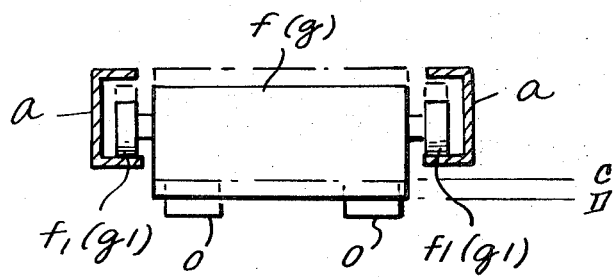
Figure 5:
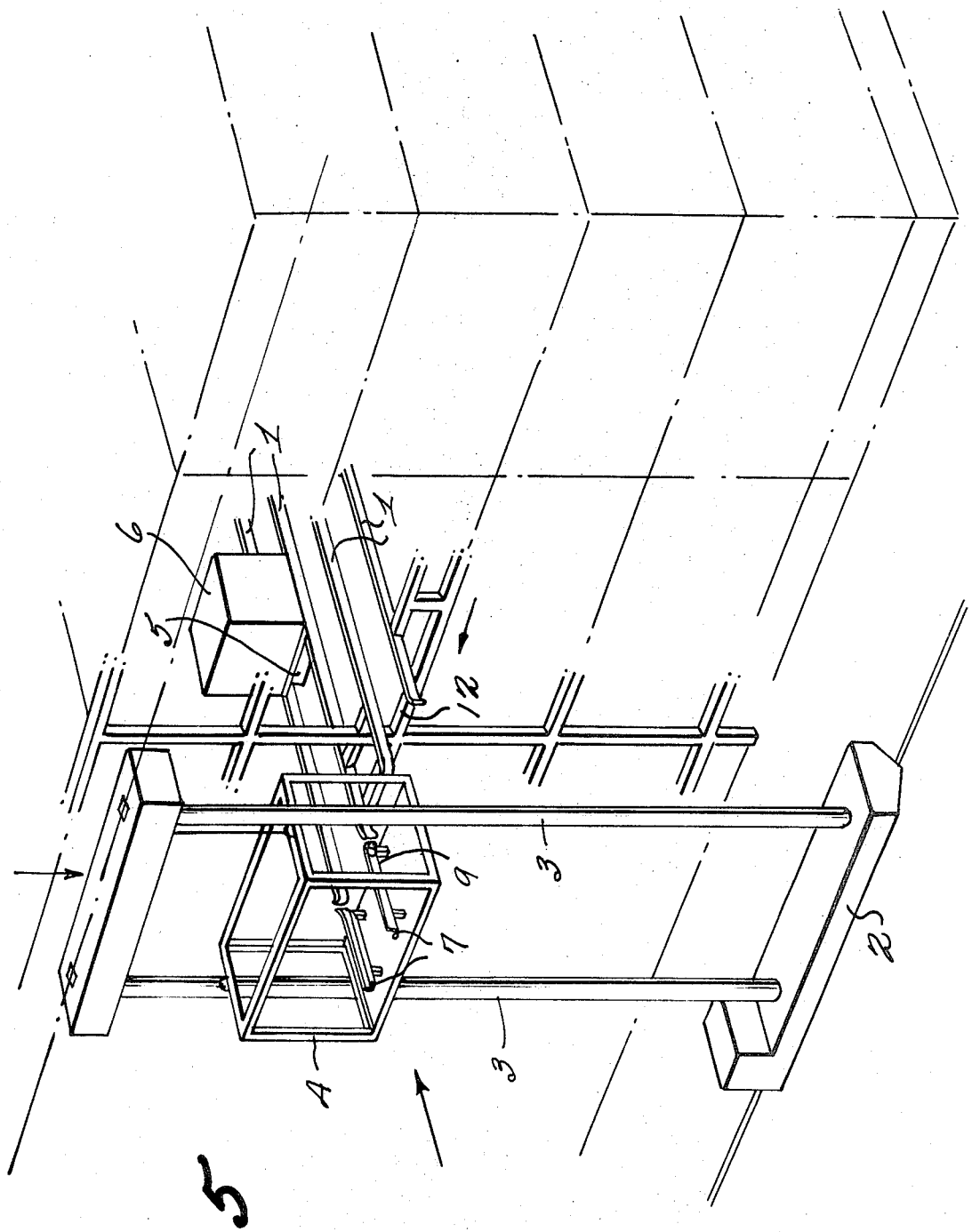
FIG. 5 is a fragmentary perspective view of an embodiment of the automatic storage system according to the present invention, showing an article loading or unloading stacker crane.
Figure 6:
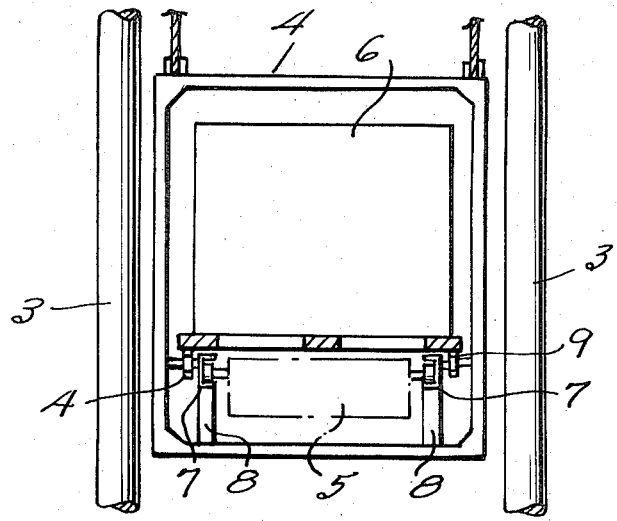
FIG. 6 is a fragmentary front view of the stacker crane.
Figure 8:
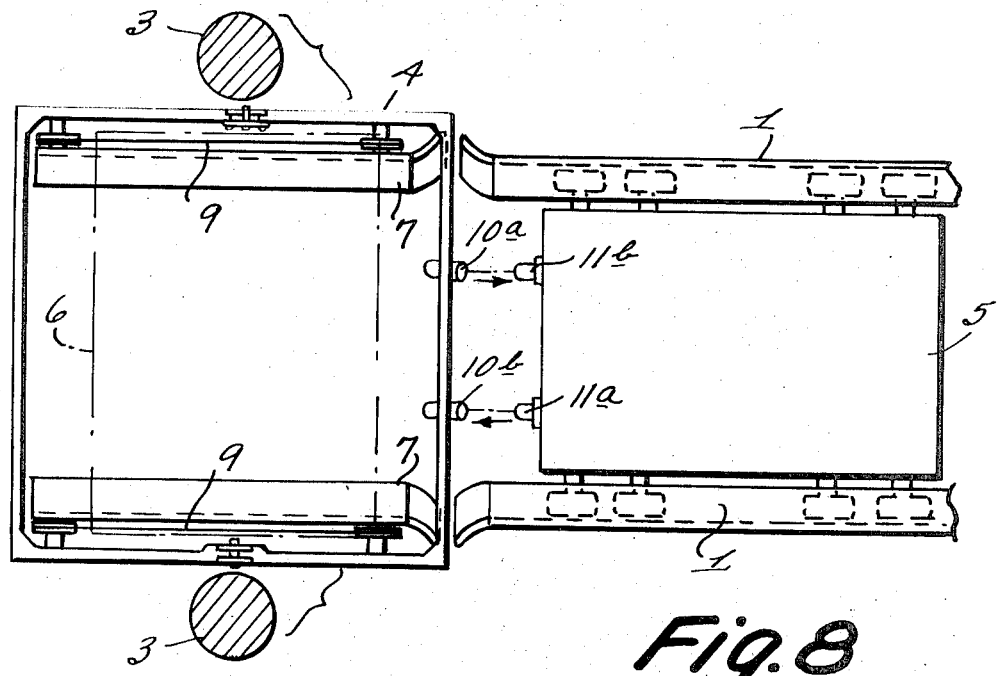
FIG. 8 is a plan view of the signal transmitting means.
Figure 7:
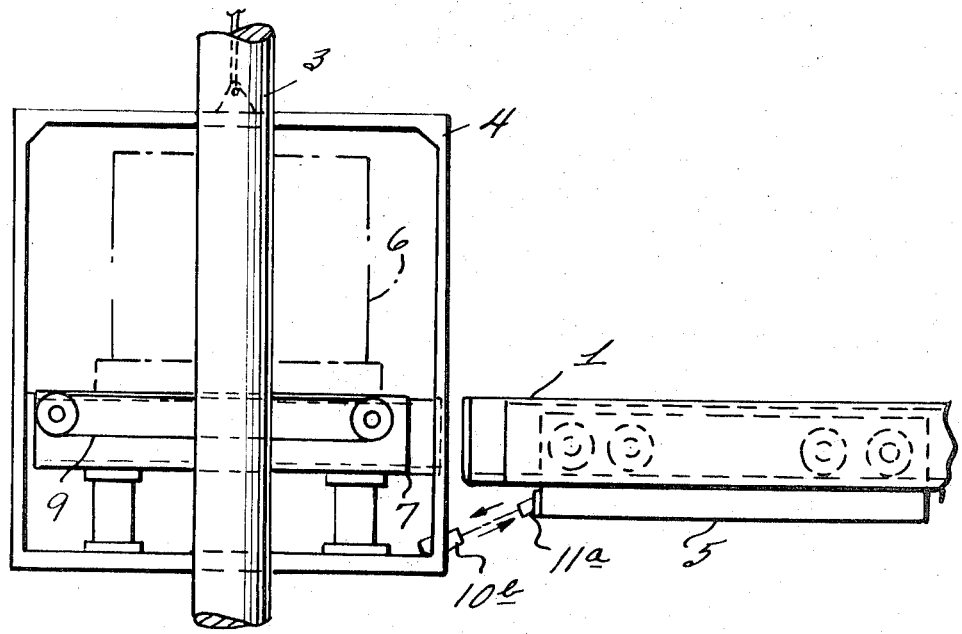
FIG. 7 is a side view of one form of signal transmitting means provided on the loading or unloading stacker crane and article receiving or delivery dolly.
Figure 9A:
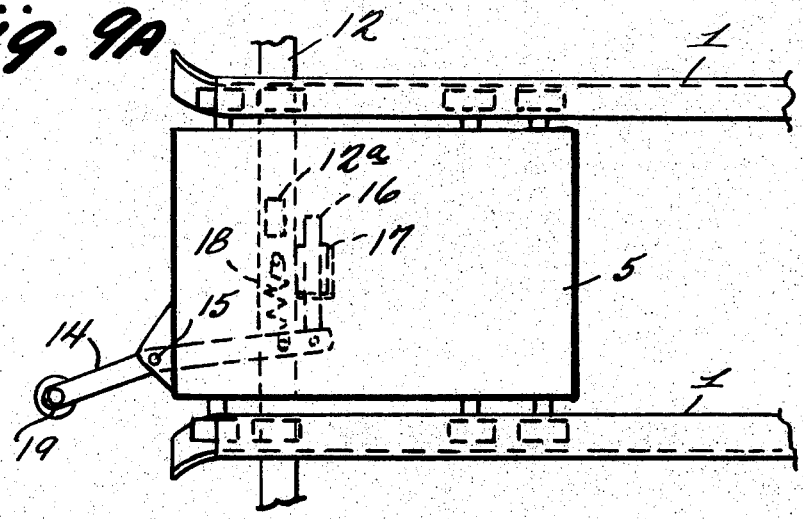
FIG. 9A is a plan view of one form of dolly droppage preventing means provided on the article receiving or delivery dolly.
Figure 9B:
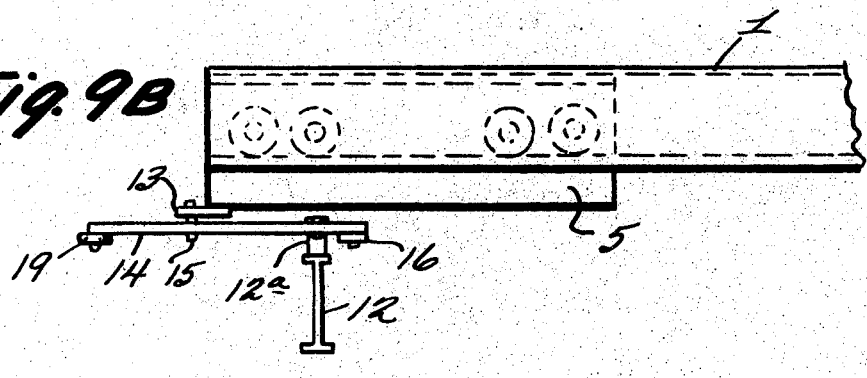
FIG. 9B is a side view of the dolly droppage preventing means.
Figure 10:
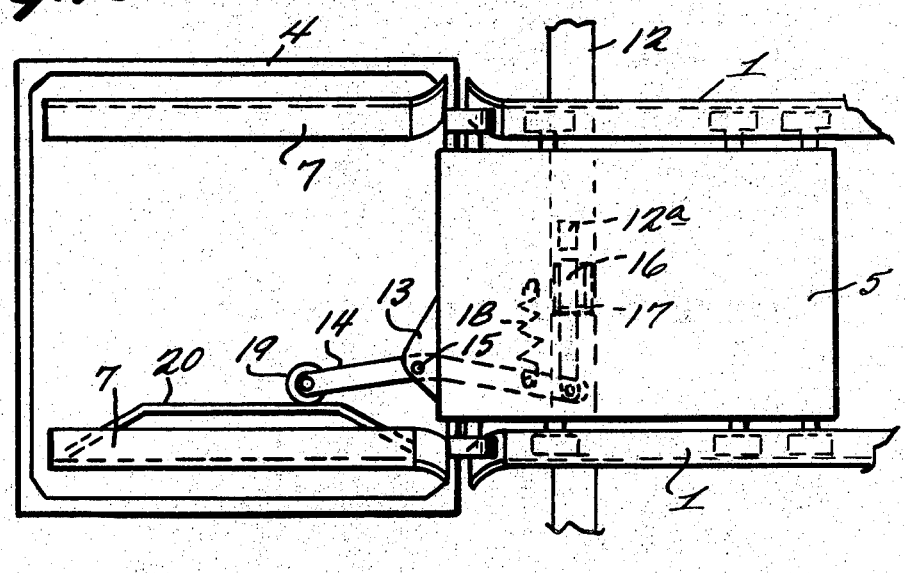
FIG. 10 is a plan view illustrating the manner in which the dolly droppage preventing means is deactivated.
Figure 11A:
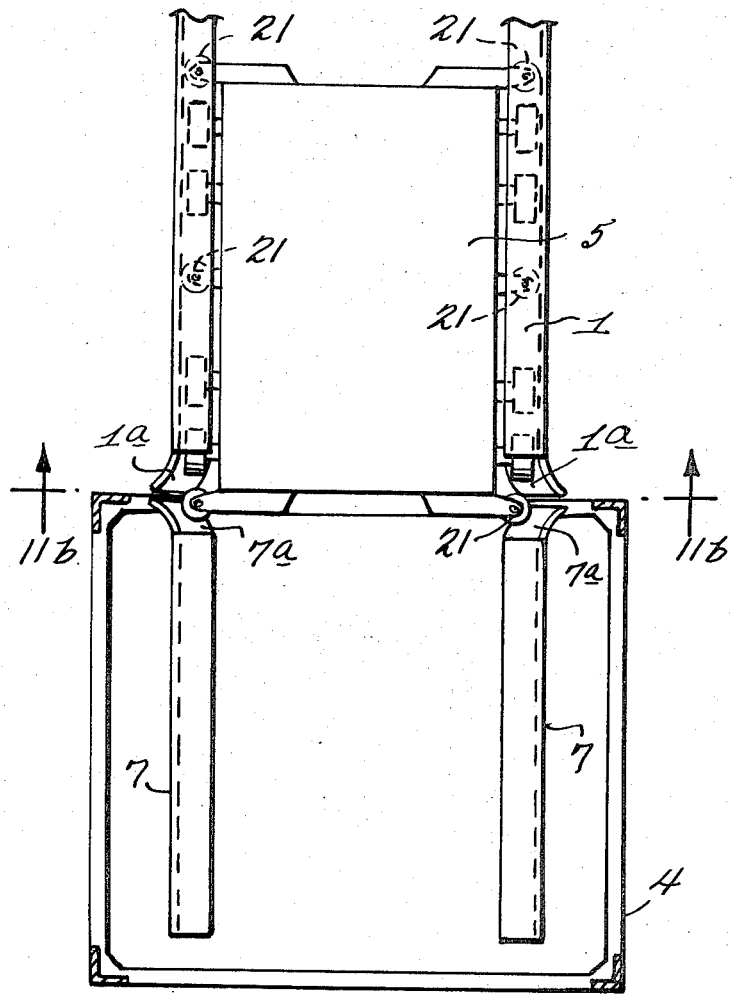
FIG. 11A is a plan view showing means for smoothly guiding the receiving or delivery dolly.
Figure 11B:
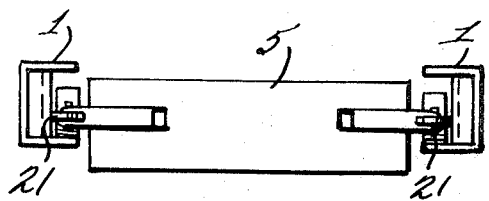
FIG. 11B is a front view of the dolly guiding means shown in FIG. 11A.
Figure 11C:
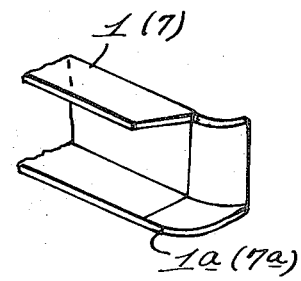
FIG. 11C is a fragmentary perspective view of a part of the dolly guiding means.

DESCRIPTION OF THE PREFERRED EMBODIMENT:

The automatic storage system of the invention will be described in greater detail hereinafter is terms of the embodiment shown in FIGS. 5 through 11. In FIG. 5, reference numeral 1 designates a number of racks arranged horizontally in a plurality of rows and vertically in a plurality of stages and each consisting of a pair of parallel bars serving simultaneously as dolly running rails; 2 an article loading or unloading stacker crane; and 3 posts of the stacker crane. The stacker crane 2 includes a carriage 4 which is operated by a motor (not shown) to move up or down in the crane by being guided by the posts 3. Reference numeral 5 designates an article receiving or delivery dolly which has disposed therein a battery as driving power source and is provided with a lift table (not shown) of the type known in the art, by which an article 6 mounted on the dolly is held lifted during travel of the dolly along the rack 1 and into the carriage 4, as will be described later. Reference numeral 7 designates a pair of dolly running rails which are most characteristic of the present invention. These rails 7, as shown in FIG. 6, are fixed to the carriage 4 through brackets 8 and will be aligned with the rack bars 1 when the carriage 4 is positioned opposite to a selected rack for loading or unloading of article, to provide for the transfer of the dolly 5 from said rack into the carriage 6. Reference numeral 9 designates an article receiving or delivery chain conveyor provided on the carriage 4, which when the stacker crane is positioned at an article receiving or delivery home position, is driven in synchronism with a chain conveyor (not shown) provided at said home position to convey an article 6 from said home position onto the stacker crane or vice versa. This chain conveyor 9 is provided exteriorly of the rails 7, 7 at such a level that its upper length will not contact the lower surface of the article 6 when said article 6 is lifted by the dolly 5 but contact said lower surface when the article 6 is lowered, to carry said article thereon. With reference to FIGS. 7 and 8, there is shown signal transmitting means provided on the stacker crane 2 and dolly 5. The signal transmitting means comprises a light emitter 10a and a light receiver 10b respectively provided at the front bottom portion of the carriage 4, and a light receiver 11b and a light emitter 11a respectively provided at the lower portion of the dolly 5 in opposed relation to said light emitter 10a and light receiver 10b provided on the carriage 4. A light emitted from the light emitter 10a and received by the light receiver 11b gives a signal to the dolly 5 authorizing said dolly to move into the carriage 4 of the stacker crane, while a light emitted from the light emitter 11a and received by the light receiver 10b gives a signal from the dolly 5 to the stacker crane 2 indicating that the transfer of the dolly 5 from the carriage 4 to the rack 1 has been completed. Whether the dolly should be returned onto the rack or not is determined depending upon whether another dolly is available or not at the rack where the article receiving or delivery operation is to take place next (see FIG. 20). The light emitter 10a and light receiver 10b, and the light emitter 11a and light receiver 11b are provided respectively in obliquely upward and obliquely downward directions, so that they will not interfere with each other during transfer of the dolly. In FIGS. 9 and 10 is shown dolly droppage preventing means provided on the underside of the dolly 5. This dolly droppage preventing means comprises a rack bar 12 extending across and immediately below each ends of the racks 1, a stopper 12a provided on said rack bar 12 below each rack 1, a bracket 13 provided on the lower front portion of the dolly 5, a lever 14 pivotally connected to said bracket 13 by a vertical pivot pin 15, a stopper 16 slidable along the rack bar 12 by being guided by a guide 17 and having one end pivotally connected to one end of said lever 14, a tension spring 18 biasing said one end portion of the lever 14 toward said guide 17, a guide roller 19 rotatably mounted on the other or outer end of said lever 14, and a small chevron-shaped guide plate provided on the stacker crane carriage 4. This dolly droppage preventing means operates in the following manner: Namely, when the carriage 4 is located in the direction of travel of the dolly 5 and the rack bars 1 are aligned with the rails 7 on the carriage, the guide roller 19 engages the guide plate 20, causing the lever 14 to make a pivotal movement in a direction in which the spring 18 is stretched as shown in FIG. 10, so that the stopper 16 does not abut against the stopper 12a, allowing the dolly 5 to continue to move past said stopper 12a. On the other hand, when the carriage 4 is not existing at the end of the rack, the lever 14 is maintained in the position shown in FIG. 9A and the stopper 16 abuts against the stopper 12a, whereby the dolly 5 is prevented from further movement and thus the droppage of the dolly 5 off the rack is avoided. As shown in FIGS. 11A, 11B and 11C, the opposing ends of the rack bars 1 and the dolly running rails 7 on the carriage 4 are respectively bent outwardly as at 1a, 7a to provide for smooth transfer of the dolly 5 from the rack 1 to the carriage 4 or vice versa, and the dolly 5 is provided with a plurality of guide rollers 21 on each side thereof parallel to the direction of travel of said dolly, to transverse displacement of the dolly 5 during travel along the rack and after entering the carriage.

Figure 20:
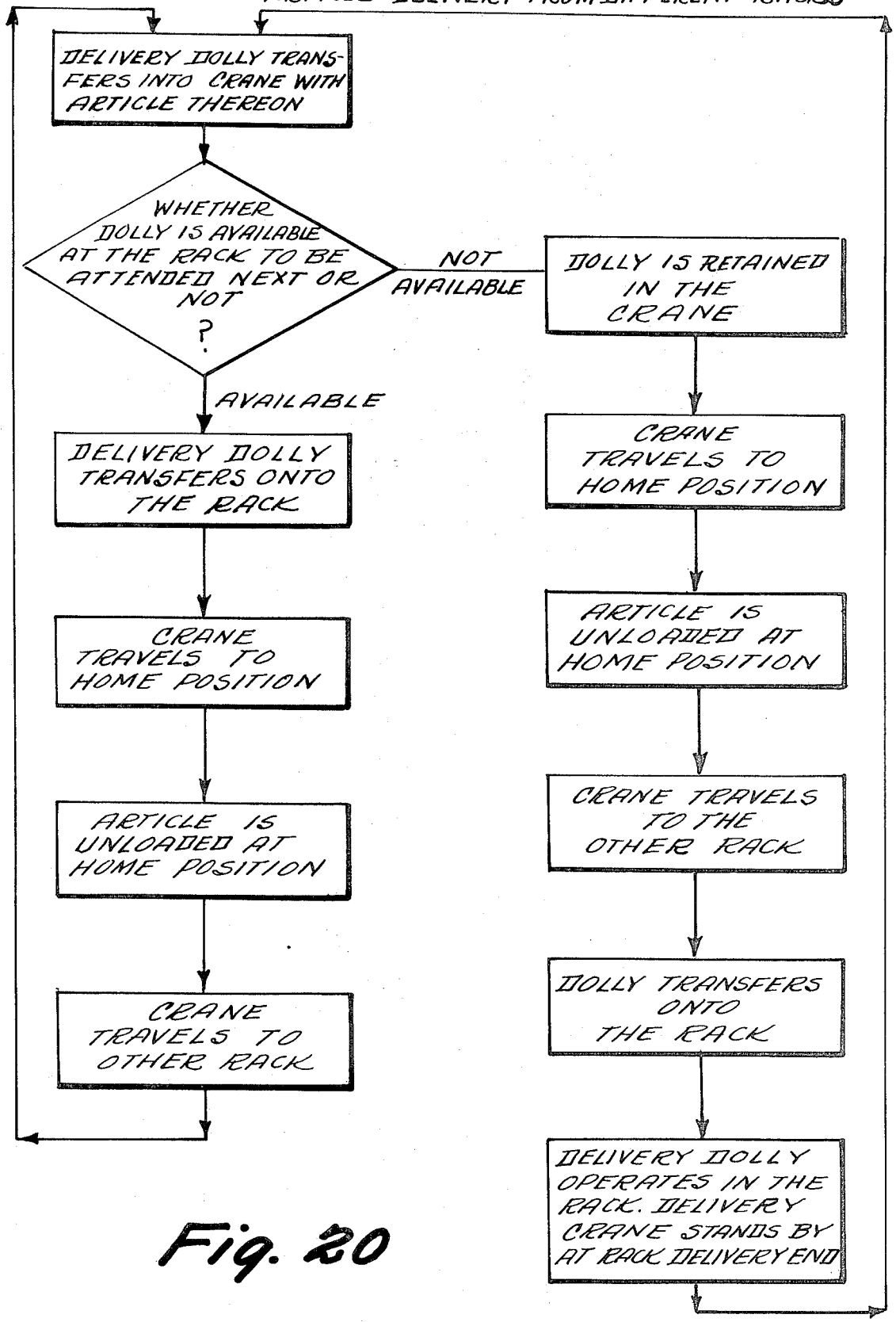
FIG. 20 is a block diagram explaining the operation of the system when the dolly is transferred to the selected rack or when the dolly remains in the associated stacker crane, depending upon whether a dolly is available or not at the rack where the next article delivery operation will take place.

Now, the operation of the automatic storage system constructed as described above will be described. With reference first to the case when articles 6 are to be successively carried onto the same rack, (I) the articles 6 are conveyed to the article receiving home position and (II) the article loading stacker crane 2 is positioned at said article receiving home position. (III) One of the articles 6 is loaded on the stacker crane 2 by means of the chain conveyor 9 provided on the carriage 4 and the chain conveyor provided at the article receiving home position. (IV) Then, the stacker crane 2 is operated under control of an article loading stacker crane control means. Namely, the stacker crane 2 is driven and concurrently the carriage 4 is elevated. When the stacker crane 2 is stopped in front of the selected rack 1, the carriage 4 is positioned opposite to the article receiving end of said rack. (V) The article receiving dolly 5 standing-by at the article receiving end of the rack 1 receives from the light emitter 10a on the carriage 4 a signal authorizing said dolly to ride onto the carriage 4. (VI) The receiving dolly 5 after receiving the signal rides onto the dolly running rails 7 of the carriage 4 while deactivating the droppage preventing means shown in FIGS. 9 and 10. (VII) In the carriage 4, the article 6 carried by the stacker crane is loaded on the dolly 5 and the dolly returns onto the rack 1 with the article 6 carried thereon. (VIII) At the moment when the dolly 5 has returned onto the rack 1, a signal is given from the light emitter 11a on the dolly 5 to the stacker crane 2, authorizing said stacker crane to leave its position and said stacker crane 2 together with the carriage 4 returns to the article receiving home position under control of the aforesaid control means. (IX) On the other hand, the dolly 5 travels along the rack 1, stops upon sensing the preceding article already set on rack, unloads the article 6 and returns to the receiving end of the rack. (X) At the receiving end of the rack, the dolly 5 is held standing-by until it receives a signal authorizing it to ride onto the carriage. (XI) One cycle of article receiving operation has thus been completed, and thereafter the stacker crane 2 and receiving dolly 5 will repeat the above-described operations until all of the articles 6 are stored on the same rack. In the event when the articles 6 are to be stored successively on different racks, this will be achieved by the following procedures: Namely, (I) the operations (I) through (VII) described above are performed. (II) The dolly 5 after unloading one article to set it on one rack returns to the receiving end of said rack and runs continually to ride directly onto the rails 7 of the stacker crane 2 without stopping at said receiving end. (III) In this case, the light emitter 10a on the stacker crane 2 gives a signal to the light receiver 11b on the dolly 5, authorizing the dolly 5 to ride onto the stacker crane. (IV) The stacker crane 2 starts running toward the article receiving home position with the dolly 5 therein. (V) Then, the operations (I) through (IV) in the preceding case are performed. (VI) The dolly 5 having the article 6 loaded thereon is transferred from the carriage 4 onto a different rack 1 and then the operations (II) through (V) in the preceding case follow. Now, in the event when the articles stored in the system are to be delivered successively from the same rack, this will be achieved by operating the article unloading stacker crane 2 and the article delivery dolly 5 in the same procedures but in reverse order to the procedures in the case of storing articles successively on the same rack. Finally, in the event when the articles stored in the system are to be delivered successively from different racks, this will be achieved by the following procedures: Namely, (I) the article unloading stacker crane 2 is shifted to the first selected rack 1 and positioned in front of said rack. In this case, the carriage 4 of said stacker crane which has previously been elevated during travel of the stacker crane is positioned opposite to the article delivery end of the rack. (II) The article delivery dolly 5 standing-by at the delivery end of the rack, with the article thereon, receives a signal from the light emitter 10a on the carriage 4, authorizing said dolly to ride onto said carriage. (III) The dolly 5 after receiving the signal rides onto the rails 7 on the carriage 4 while deactivating the droppage preventing means shown in FIGS. 9 and 10. (IV) In the carriage 4, the article 6 carried on the dolly 5 is unloaded and set on the chain conveyor 9. (V) A signal representative of presence or absence of the other dolly at the other rack from which the article is to be delivered next, is given to control means provided on the stacker crane 2 from a delivery control panel which controls the operation of the delivery stacker cranes and stores the types and quantities of the articles to be delivered from the system, and when the other dolly is present at the other rack, the dolly transferred onto the stacker crane 2 returns onto the rack therefrom, whereas when the other dolly is not present at the other rack, the dolly remains in the stacker crane 2, as indicated in FIG. 20. Thereafter, the articles are delivered successively from the different racks by the procedures illustrated in FIG. 20. It should be noted that in the article storing and delivery operations described above, the article receiving dolly and article delivery dolly on the same rack are controlled by control means provided on the article receiving side and article delivery side of the system respectively, such that they will not be operated concurrently.

Figure 18:
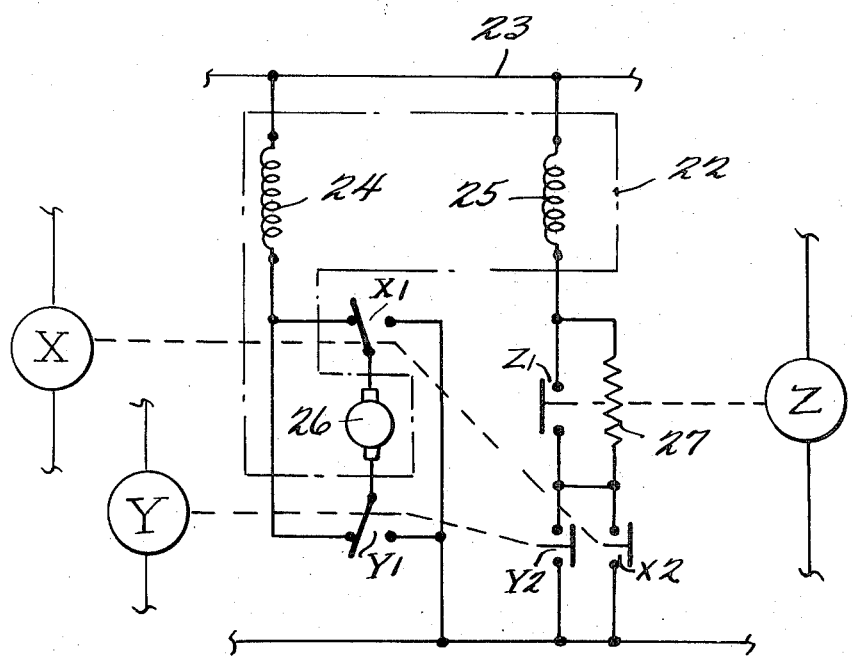
FIG. 18 is a diagram of dolly speed controlling means.

Although the present invention has been described hereinbefore in terms of a specific embodiment thereof, it is to be understood that the following modification is possible of the embodiment: Namely, where it is desired to increase the loading and unloading efficiency of the dolly, this may be achieved simply by increasing the running speed of the dolly. In this case, however, it is preferable to increase the running speed of the dolly only when said dolly is not carrying the article, because increasing the running speed of the dolly with the article loaded thereon would possibly result in disintegration of the article. A speed control device to achieve this is shown in FIG. 18, which comprises a battery as driving power source. The speed control device shown is of field control type and includes a motor 22, a motor controlling power line 23, a series coil 24, a shunt coil 25, an armature 26, a resistor 27, a forward movement conditioning relay X, a backward movement conditioning relay Y and a high speed movement conditioning relay Z. In FIG. 18, reference symbols X1, X2 designate contacts of the forward movement conditioning relay X; Y1, Y2 contacts of the backward movement conditioning relay Y; and Z1 a contact of the high speed movement conditioning relay Z, all of which are shown being in positions when the relays X, Y, Z are not actuated. When the forward movement conditioning relay is actuated by a control circuit (not shown), the contact X1 is closed, whereby a circuit is formed including the series coil 24, the contact Y1, the armature 26 and the contact X1, and the contact X2 is closed concurrently, whereby a circuit is formed including the shunt coil 25, the normally closed contact Z1 and the contact X2, so that the armature 26 of the motor 22 is set in motion, rotating as a compound motor.

However, when the backward movement conditioning relay Y is actuated, there are formed, by the action of the contacts Y1, Y2, a circuit including the series coil 24, the contact X1, the armature 26 and the contact Y1, and a circuit including the shunt coil 25, the contact Z1 and the contact Y2, so that the armature only is connected in the opposite phase to that in case of the forward movement and hence makes reverse rotation.

Further, when the high speed movement conditioning relay Z is actuated in each of the cases described above, the normally closed contact Z1 is opened and a circuit is formed including the shunt coil 25, and resistor 27 and the contact X2 or Y2, so that the current passing in said circuit is attenuated by the resistor 27. Accordingly the magnetic force of the shunt coil 25 is attenuated and as a result, the magnetic force of the field of the motor 22 is weakened, while the current passing in the circuit of the armature 26 remains unchanged. Thus, the speed of the armature 26 increases.

Figures 12, 13:
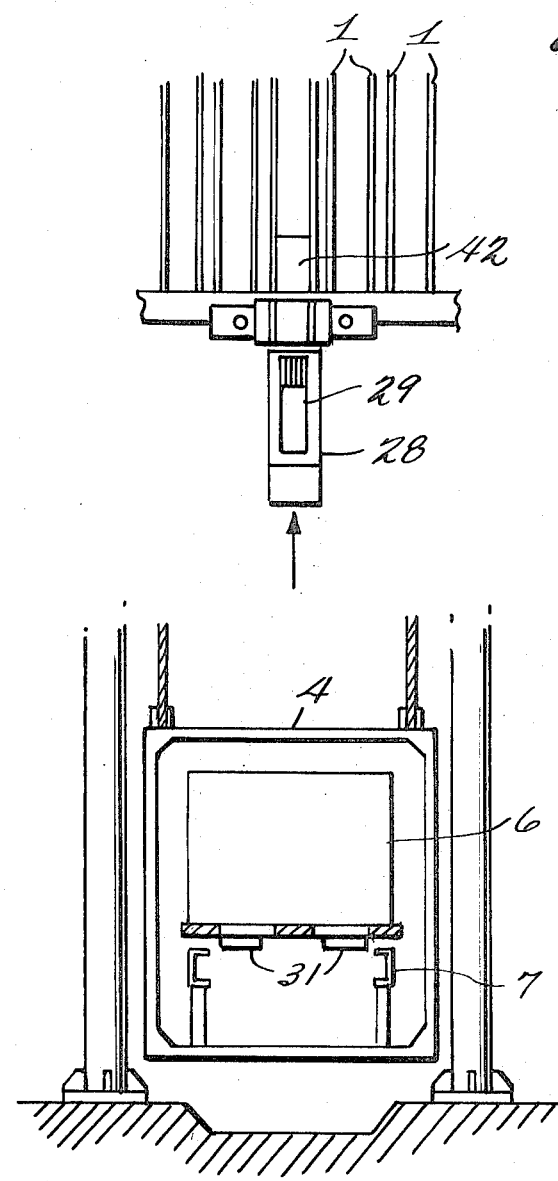
FIG. 12 is a plan view of one form of forking means provided at each of article receiving and delivery home positions.
FIG. 13 is a front view illustrating the manner in which the fork of the forking means moves into the carriage of the loading or unloading stacker crane.
Figure 14:
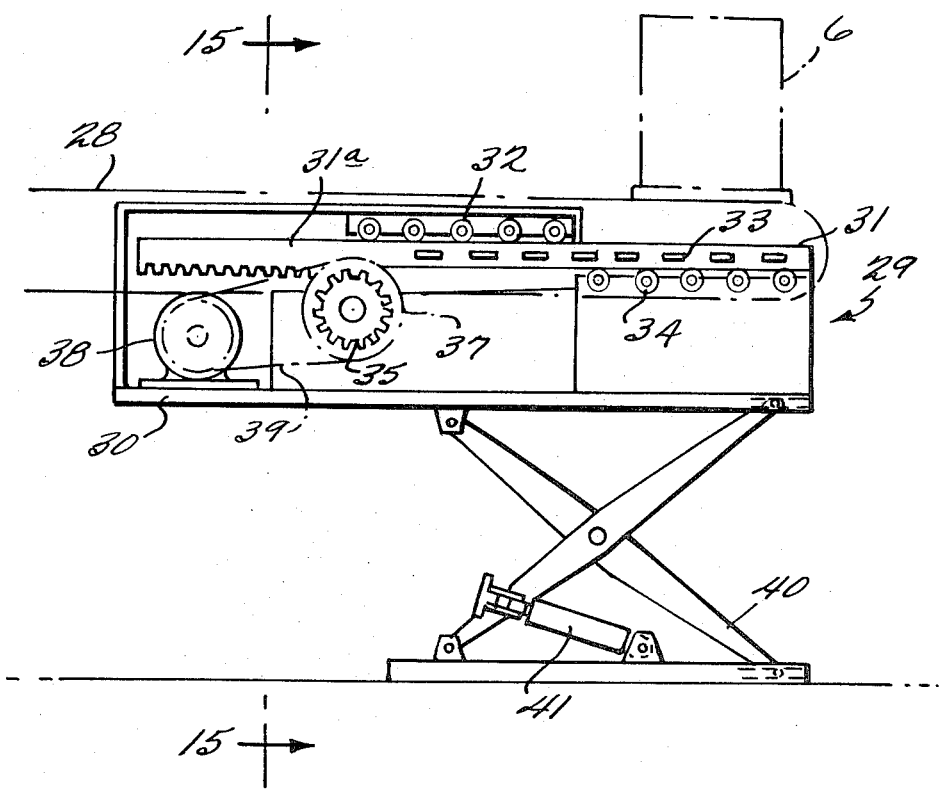
FIG. 14 is a side view of the forking means.
Figure 15:
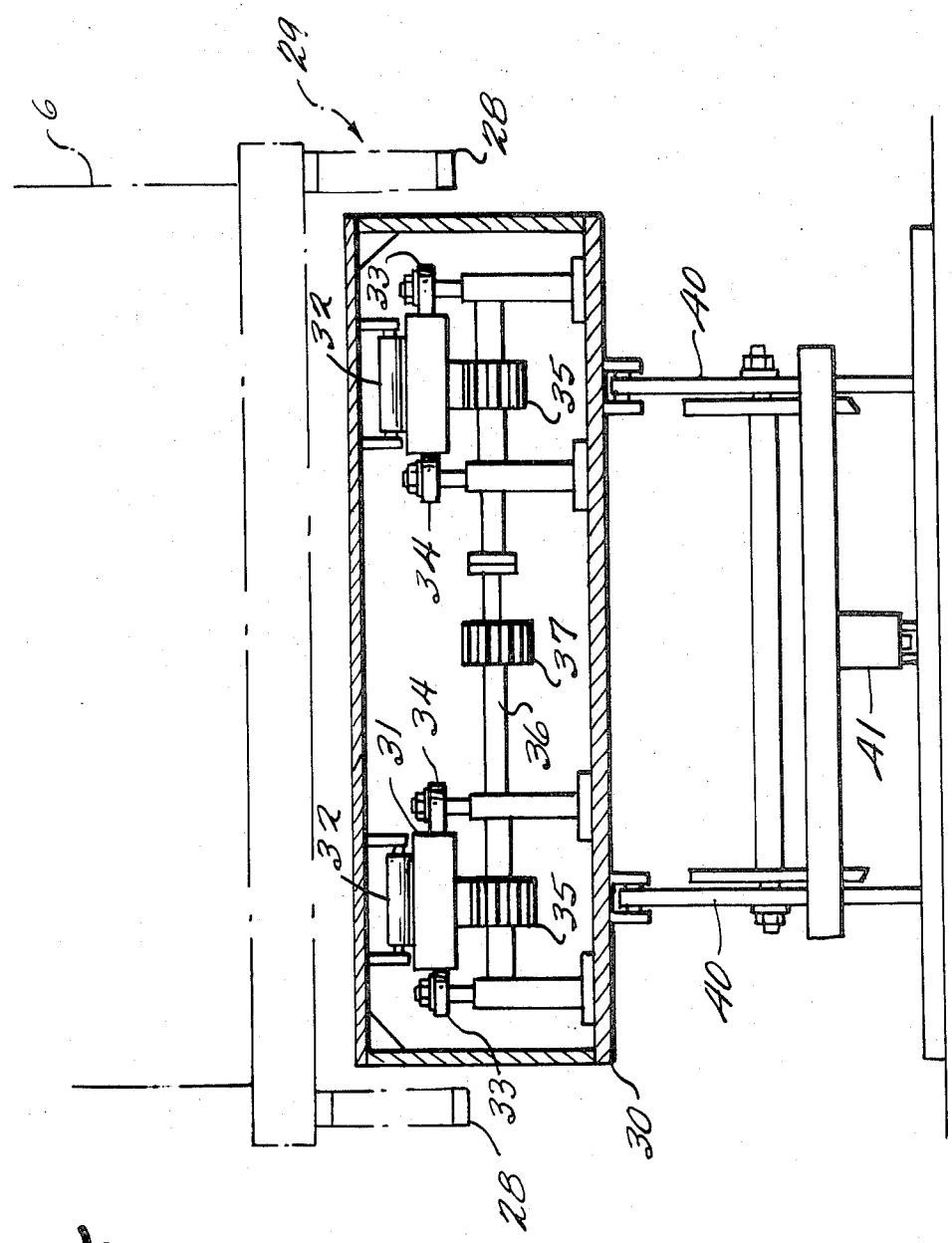
FIG. 15 is a vertical sectional front view along the line XV—XV of FIG. 14.
Figure 17:
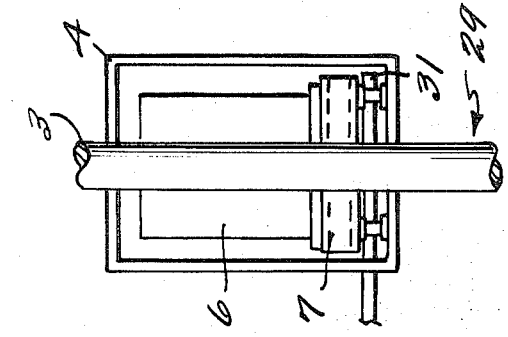
FIGS. 16 and 17 are side views showing the positional relation of the fork of the forking means and the dolly running rails of the carriage.
Figure 16:
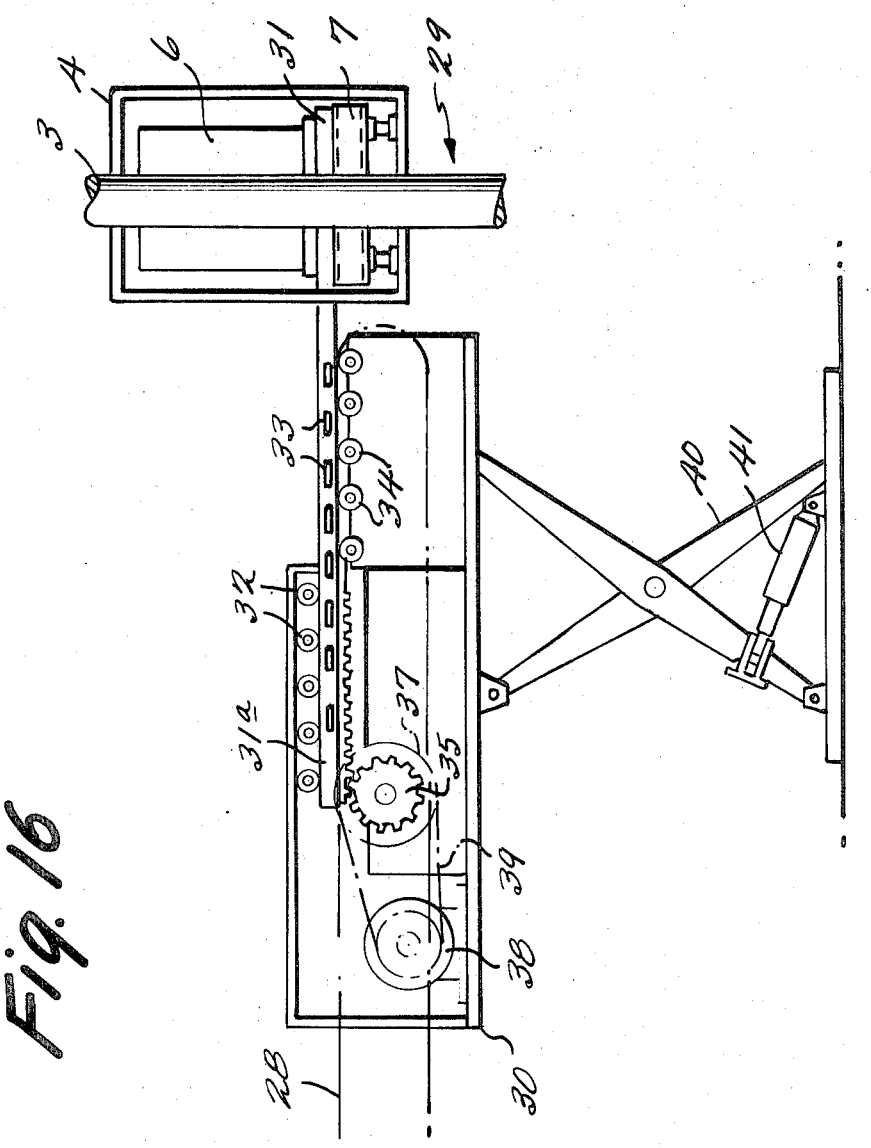
Figure 19A:
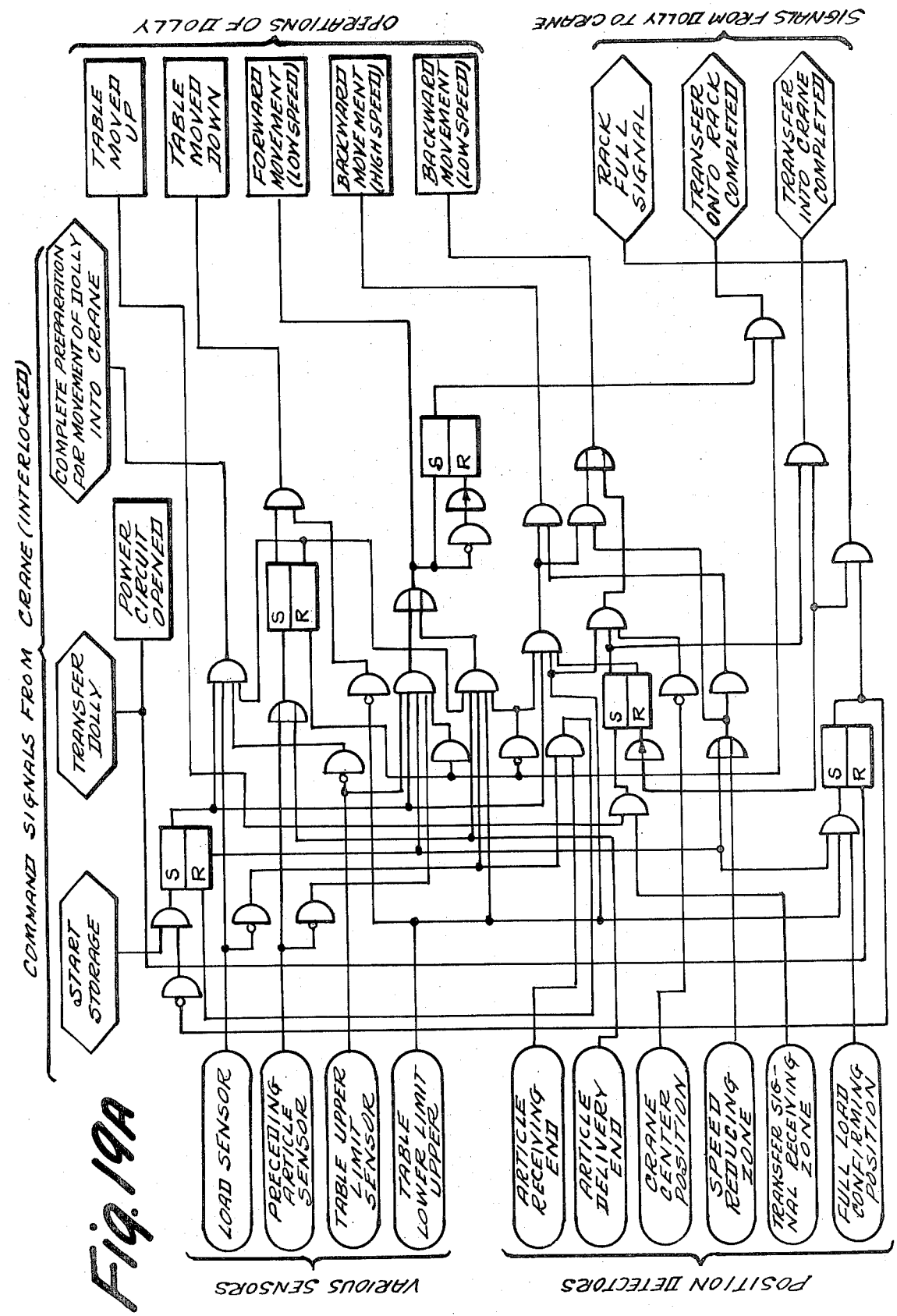
FIG. 19A is a diagram for illustrating the manner of operating the article receiving dolly.
Figure 19B:
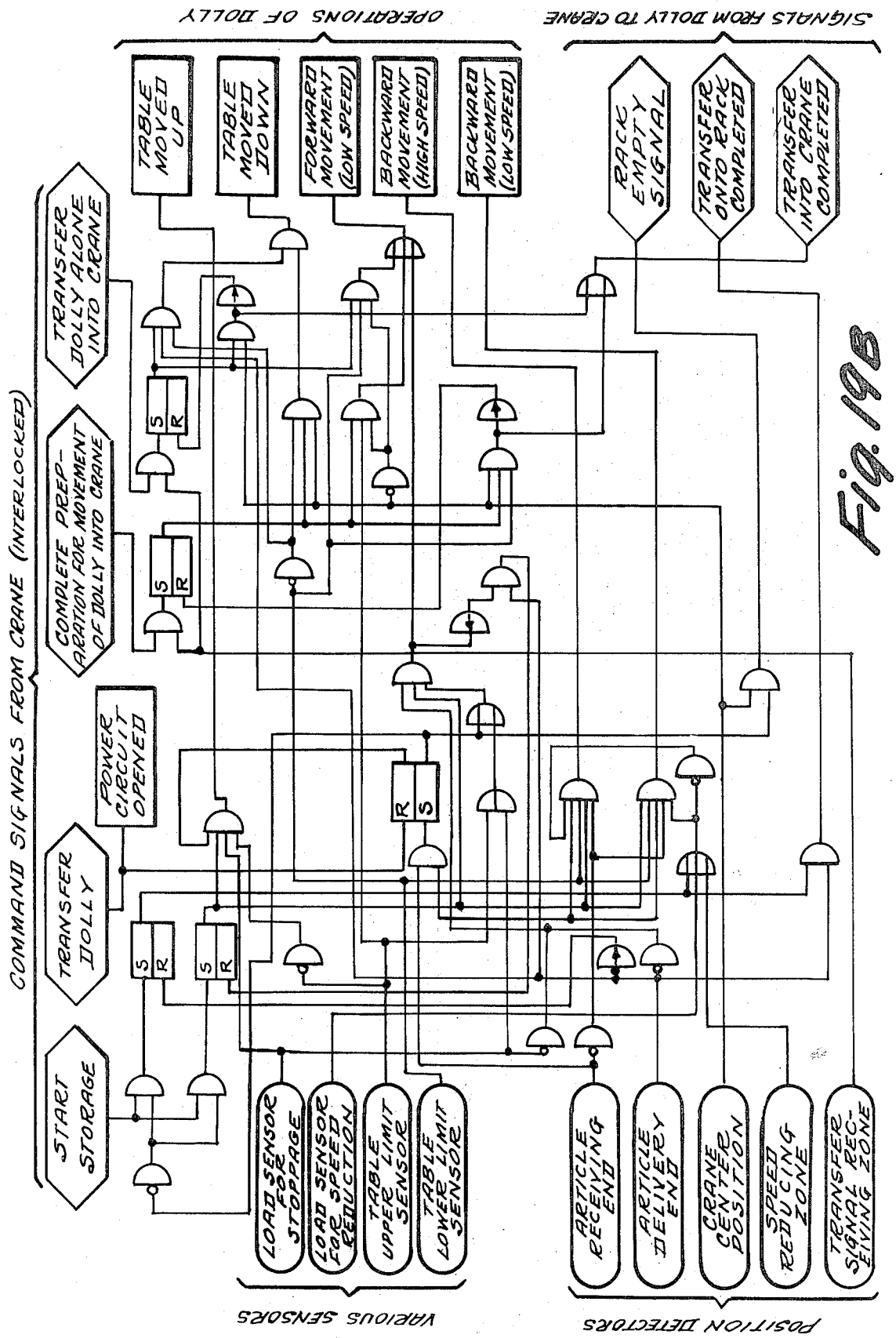
FIG. 19B is a diagram similar to FIG. 19A but for illustrating the manner of operating the article delivery dolly.

The chain conveyor 9 provided on the carriage 4 of each stacker crane 2, which is driven in synchronism with the chain conveyor provided at each home position for conveying articles from the article receiving home position onto said carriage 4 or from said carriage 4 to the article delivery home position, may be substituted by forking means as shown in FIGS. 12 through 17. In FIG. 12, reference numeral 28 designates the article receiving or delivery home position and 29 designates the forking means provided at said home position. As shown in detail in FIGS. 14 through 17, the forking means comprises a frame structure 30, forks 31, guide rollers 32–34 longitudinally movably supporting each fork 31 from all sides, pinions 35 respectively meshing with rack portions 31a of the forks 31, a shaft 36 supporting said pinions 35, a sprocket 37 mounted on the center of said shaft 36, a motor 38 for driving said sprockets and a drive chain 39 drivingly connecting said motor 38 with said sprockets. The forks 31 are moved longitudinally forwardly or backwardly when the motor 38 is driven in one or the other direction. Below the frame structure 30 is provided scissors means 40 which is operated by hydraulic cylinder means 41 to move said frame structure 30 up and down. FIG. 14 shows an article 6 just arrived at the article receiving home position 28 via an article receiving conveyor and article transfer means. When the article loading stacker crane 2 is positioned at the home position 28 in this state, the article receiving dolly 5 carried on the stacker crane is transferred therefrom onto the rack 1 opposite to said home position 28 as indicated at 42 in FIG. 12. Then, the frame structure 30 of the fork means, including the forks 31, is lifted by the hydraulic cylinder means 41 to a level higher than the home position 28 to support the article 6 on the forks 31. Then, the motor 38 is driven in the normal direction, whereupon the forks 31 are moved forward and the article 6 is carried thereon into the carriage 4 of the stacker crane 2 as shown in FIGS. 13, 16. The hydraulic cylinder means 41 is now operated in the opposite way to the case of lifting the frame structure 30, so that said frame structure 30 is lowered and thus the forks 31 are lowered below the dolly running rails 7 of the carriage 4 to place the article 6 on said rails as shown in FIG. 17. After the article 6 has thus been transferred into the stacker crane 2, the motor 38 is driven in the reverse direction and the forking means 29 is returned to its original position shown in FIG. 14. The delivery of an article from the article unloading stacker crane to the article delivery home position is effected by operating the forking means as follows: Namely, when the article unloading stacker crane has been positioned at the article delivery home position and the article delivery dolly carried on said stacker crane has been transferred onto the opposite rack or to a retreated position, the motor 38 is driven in the normal direction in the state shown in FIG. 14, whereby the forks 31 are moved into the carriage 4 of the unloading stacker crane 2 as shown in FIG. 17. Then, the forks 31 are elevated by the hydraulic cylinder means 41 to lift the article 6 off the carriage as shown in FIGS. 13, 16. The article 6 thus transferred onto the forking means is carried to the delivery home position by driving the motor 38 in the reverse direction. The hydraulic cylinder means 41 is operated in the reverse way to the case of lifting the forks and thereby the article 6 is set on the delivery home position as shown in FIGS. 14, 15. By providing the forking means of the construction and function described above, the chain conveyor 9 can be eliminated.

It should also be understood that, while in the embodiment described herein a light transmitting method is employed for transmitting the signal indicating the completion of preparation for movement of the dolly from the rack onto the stacker crane and the signal indicating the completion of movement of the dolly from the stacker crane to the rack, a contactless signal transmitting method, such as the indicative radio transmitting method, may of course be employed in lieu of the light transmitting method.

It should also be noted that in the embodiment described herein the stopper 16 of the dolly droppage preventing means is operated mechanically but it may be operated electrically or other methods.

Although the present invention has been described and illustrated herein in terms of a specific embodiment thereof, it should be understood that the invention is not restricted only to the embodiment but many changes and modifications are possible within the scope not deviating from the spirit of the invention.

We claim:

1. An automatic storage system of the type comprising article receiving dollies and article delivery dollies, a number of racks arranged horizontally in a plurality of rows and vertically in a plurality of stages and each serving simultaneously as dolly running rails, article loading stacker cranes and article unloading stacker cranes respectively movable along the article receiving and delivery ends of said racks and each being provided therein with a vertically movable carriage, article receiving home positions and article delivery home positions respectively provided on the article receiving and delivery sides of the racks, control means provided on the article receiving side of the racks for controlling the article storing operation such that the transfer of an article from each article receiving home position to the article receiving end of a selected rack is effected by one of said article loading stacker cranes and the transportation of the article from said receiving end to an inner position of the rack is effected by one of said article receiving dollies, and control means provided on the article delivery side of the racks for controlling the article delivery operation such that the transportation of an article from the stored position to the article delivery end of the associated rack is effected by one of said article delivery dollies and the transfer of the article from said delivery end to one of the article delivery home positions is effected by one of said article unloading stacker cranes; characterized in that each of said carriages is provided with a pair of dolly running rails which, when the associated stacker crane is positioned in front of a selected rack, will be aligned with the opposite end of said rack in contact therewith to provide for movement of the dolly from the rack onto the carriage or vice versa and each of said control means is so operative that the dolly transferred onto the stacker crane upon unloading the article therefrom is returned to the rack to or from which the article has been carried in or carried out when the other dolly is available at the rack where the next article storing or delivery operation will take place, or is retained in the stacker crane and carried to one of the article receiving or delivery home positions when the other dolly is not available at the rack where the next article storing or delivery operation will take place.

2. An automatic storage system as claimed in claim 1, wherein each of said carriages is further provided with a chain conveyor exteriorly of and adjacent said pair of dolly running rails for conveying articles from said carriage onto one of said home positions, and the upper run of said chain conveyor is made higher than the upper surfaces of said rails.

3. An automatic storage system as claimed in claim 1, wherein a transverse bar is provided below each ends of the racks in each stage across said racks and a projecting stopper member is provided on said transverse bar below each rack, while an engaging member is retractably provided on the lower surface of each dolly which is held in a projected position by an external force for engagement with said stopper member when the stacker crane is not positioned in front of said end of said rack, whereby the dolly is prevented from moving off the rack.

4. An automatic storage system as claimed in claim 1, wherein each ends of a pair of bars constituting the rack are bent outwardly relative to each other and the confronting ends of the rails provided on each carriage are also bent outwardly relative to each other, and further a plurality of outwardly projecting guide rollers are provided on each side of each dolly.

5. An automatic storage system as claimed in claim 1, wherein each of said dollies had disposed therein a battery as driving power source, a forward movement relay and a backward movement relay respectively actuated in response to command signals for causing forward and backward movements of said dolly, and a high speed control relay actuated in response to a command signal for causing high speed movement of said dolly when said dolly is carrying no article thereon.

* * * * *